United States Patent [19]

Vasta

[11] 4,169,117
[45] Sep. 25, 1979

[54] AROMATIC POLYSULFONE RESIN SOLUTION HAVING PERFLUOROCARBON POLYMER PARTICLES DISPERSED THEREIN

[75] Inventor: Joseph A. Vasta, Woodbury, N.J.

[73] Assignee: E. I. Du Pont de Nemours and Company, Wilmington, Del.

[21] Appl. No.: 635,769

[22] Filed: Nov. 26, 1975

Related U.S. Application Data

[62] Division of Ser. No. 340,845, Mar. 13, 1973, abandoned.

[51] Int. Cl.$^2$ .................... C08L 27/18; B32B 15/04; B05D 3/02
[52] U.S. Cl. .................... 525/150; 260/29.1 SB; 260/30.2; 260/32.8 R; 260/33.6 F; 428/35; 428/411; 428/457; 427/318; 427/375; 428/422
[58] Field of Search ............ 260/900, 79.3 M, 33.6 F, 260/33.8 F, 29.6 NR, 29.6 F, 30.8 R, 32.6 R, 29.1 SB, 30.2, 32.8 R; 428/35, 422, 457, 332, 339, 411

[56] References Cited

U.S. PATENT DOCUMENTS

| | | | |
|---|---|---|---|
| 2,777,783 | 1/1957 | Welch | 260/33.8 F |
| 3,355,272 | 11/1967 | D'Allessandro | 260/844 |
| 3,418,277 | 12/1968 | Cohen et al. | 260/49 |
| 3,432,468 | 3/1969 | Gabler | 260/47 |
| 3,471,587 | 10/1969 | Whittemore et al. | 428/457 |
| 3,487,454 | 12/1969 | Oates et al. | 260/900 |
| 3,518,235 | 6/1970 | Cohen et al. | 260/79.3 M |
| 3,536,665 | 10/1970 | Pietrusza et al. | 260/49 |
| 3,657,177 | 4/1972 | Adesko | 260/30.4 R |
| 3,661,831 | 5/1972 | Fang | 260/33.6 F |
| 3,769,150 | 10/1973 | King et al. | 428/457 |
| 3,981,945 | 9/1976 | Attwood et al. | 428/422 |
| 3,993,843 | 11/1976 | Vasta | 260/900 |
| 4,131,711 | 12/1978 | Attwood | 260/900 |

*Primary Examiner*—William R. Dixon, Jr.

[57] ABSTRACT

The novel coating composition contains a uniformly dispersed perfluorocarbon polymer in an organic solvent solution of an aromatic polysulfone resin; finishes of the novel composition have excellent grease and stain resistance, good thermal stability, toughness and durability and good release properties and are useful as coatings for vessels, appliances, industrial equipment and in particular as release finishes for bakeware and cookware.

5 Claims, No Drawings

AROMATIC POLYSULFONE RESIN SOLUTION HAVING PERFLUOROCARBON POLYMER PARTICLES DISPERSED THEREIN

CROSS REFERENCE TO RELATED APPLICATIONS

This is a divisional application of Ser. No. 340,845 filed Mar. 13, 1973 now abandoned.

BACKGROUND OF THE INVENTION

This invention relates to a coating composition and in particular to a coating composition of a polysulfone resin.

Industry requires finishes that are tough, durable and scratch resistant and are thermally stable for equipment subjected to heat such as household and industrial ovens. Home and industrial bakeware and cookware require finishes that have food release properties and thermal stability. Also, the exterior areas of cookware such as fry pans, covers for fry pans, the sides and bottoms of electric cooking appliances require finishes that are tough, durable, thermally stable, and have release properties. Finishes of polysulfone resins meet some of these requirements. Polysulfone resins are well known in the art as shown by Vogel U.S. Pat. No. 3,321,449, issued May 23, 1967; D'Alessandro U.S. Pat. No. 3,355,272, issued Nov. 28, 1967; Cohen et al. U.S. Pat. No. 3,518,235, issued June 30, 1970; Pietrusza et al. U.S. Pat. No. 3,536,665, issued Oct. 27, 1970. However, it has not been possible to form high quality release coatings from these resins. Dispersions of polyarysulfones and fluorinated polyphenylene oxide polymers are shown in Whittemore et al. U.S. Pat. No. 3,471,587, issued Oct. 7, 1969 but these dispersions do not form the high quality finishes that are required for many uses.

The novel coating composition of this invention has excellent adhesion to all types of substrates and is tough, durable and thermally stable and has excellent release properties.

SUMMARY OF THE INVENTION

The coating composition of this invention comprises 5–60% by weight of a binder of an aromatic polysulfone resin dissolved in a solvent and a dispersed perfluorocarbon polymer and correspondingly, 40–95% by weight of a solvent for the aromatic polysulfone resin; wherein the binder consists essentially of (1) 15–85% by weight, based on the weight of the binder, of a polysulfone resin of the formula

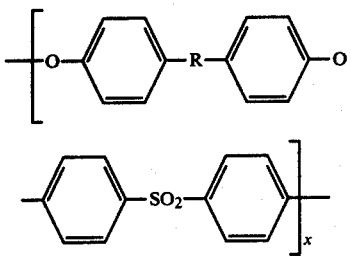

where R is an alkylene group having 1–6 carbon atoms and x is from 50–120; and correspondingly;

(2) 85–15% by weight, based on the weight of the binder, of a uniformly dispersed perfluorocarbon polymer, preferably polytetrafluoroethylene or a copolymer of tetrafluoroethylene and hexafluoropropylene.

DESCRIPTION OF THE INVENTION

The dispersion of this invention preferably contains about 20–55% by weight of the film-forming binder. The dispersion can contain pigments which are uniformly dispersed therein in a pigment to binder weight ratio of about 1:100 to about 200:100.

The aromatic polysulfone resin used in the novel coating composition of this invention has repeating units of the formula

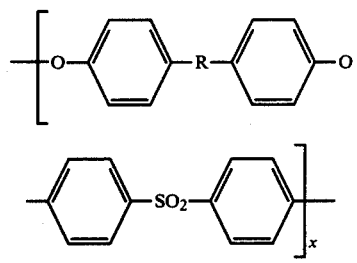

where R is an alkylene group of 1–6 carbon atoms and x is from 50–120. In one preferred polysulfone resin of the type that forms a high quality composition, R is

and x is from 50–80. This preferred resin can be prepared according to Example 1 of the above D'Alessandro U.S. Pat. No. 3,355,272.

Preferably, the binder of the novel coating composition of this invention contains 50–75% by weight of the aromatic polysulfone resin, and correspondingly, 50–25% by weight of the perfluorocarbon polymer.

The perfluorocarbon polymer preferably is polytetrafluoroethylene or a copolymer of tetrafluoroethylene and hexafluoropropylene. The copolymer has a tetrafluoroethylene to hexafluoropropylene weight ratio of about 95/5 to about 50/50. Preferably, the copolymer has a weight ratio of about 75/25 to about 85/15 of tetrafluoroethylene to hexafluoropropylene. Other perfluorocarbon polymer such as polyvinylidene fluoride can also be used.

The dispersed perfluorocarbon particles have a particle diameter of about 0.01 to about 6 microns. Preferably, the dispersions have particles in the range of 0.01–2.0 microns and form dispersions with excellent stability.

The novel coating composition of this invention is prepared by dissolving the aromatic polysulfone resin in a solvent for the resin and then adding an organic dispersion of the perfluorocarbon polymer to the solution and thoroughly blending the constituents together to form the novel coating composition of this invention.

The organic dispersion of the perfluorocarbon polymer is prepared according to conventional techniques in which the polymer is dispersed in an organic liquid by ball milling, or pebble milling 12–100 hours. Typical organic liquids that can be used are toluene, xylene, ketones such as methyl isobutyl ketone and the like.

The following are typical solvents that are useful in preparing the solution of the polysulfone resin and in diluting the novel composition to an application viscosity: methylene chloride, trichloroethylene, monochlorobenzene, cyclohexanone, chloroform, chlorobenzene, Tetrachloroethylene, 1,1,2,2-tetrachloroethane, xylene, tetrahydrofuran, N-methyl pyrrolidone, dimethyl formamide, dimethyl acetamide, a blend of acetone/toluene or a blend of toluene and a chlorinated solvent such as methylene chloride or chloroform.

Pigments in the above pigment to binder ratio can be blended with the coating composition and then ground by conventional techniques, such as pebble milling or ball milling to uniformly disperse the pigment in the composition. Preferably, the pigment is formed into a mill base by grinding the pigment with the solution of the polysulfone resin. The mill base is then blended with the novel coating composition.

The following are examples of the great variety of pigments which can be used in the novel coating composition of this invention: metallic oxides, preferably titanium dioxide, zinc oxide, and the like, metal hydroxides, metal flakes, such as aluminum flake, metal powders, sulfides, sulfate, carbonates, carbon black, silica, silicates, hydrophobic silicates, such as silicone treated with silicon dioxide, talc, china clay, iron oxide, iron blues, organic reds, maroons and other organic dyes and lakes. For high temperature use, a temperature resistant pigment, such as carbon black or red iron oxide are used.

About 0.1–5% by weight, based on the weight of the binder, of a silicone resin can be added to the novel coating composition. These silicon resins have the formula

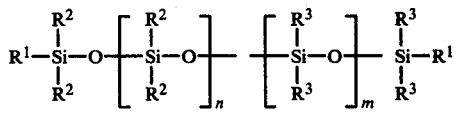

where $R^2$ and $R^3$ are monovalent radicals of hydrogen, an alkyl group having 1–8 carbon atoms such as methyl, ethyl, propyl, isopropyl, butyl, isobutyl, pentyl, hexyl, 2-ethylhexyl or octyl or an aryl group such as phenyl, biphenyl, tolyl, xylyl, naphthyl; $R^1$ is any of the above monovalent radicals including a hydroxyl radical; n and m are positive integers from 0–3000 and are sufficiently large to provide a film-forming resin. Preferably, n and m are from about 20–400. Typical silicon resins are a blend of dimethyl polysiloxane and diphenyl polysiloxane, dimethyl polysiloxane, dimethyl diphenyl polysiloxane, hydroxy terminated dimethyl diphenyl siloxane and the like. Dimethyl diphenyl polysiloxane is a preferred resin since it forms a high quality finish.

The coating composition of this invention can be applied to a variety of substrates, for example, metal, glass or plastics by any of the usual application methods, such as spraying, electrostatic spraying, dipping, brushing, flow coating, roller coating, reverse roller coatings and the like. These coatings are baked at about 150°–300° C. for about 5 minutes to 2 hours. The resulting coating is about 0.1–10 mils thick and preferably, 0.5–5 mils thick.

The novel coating composition of this invention provides finishes that have excellent release properties, good water and stain resistance and excellent thermal resistance making the finishes particularly suitable for bakeware, such as muffin pans, bread pans, cookie sheets and other commonly used household cooking vessels. Preferably, an aluminum substrate is used which may be treated, primed or roughened before the finish is applied and baked. Iron, steel and steel alloys can also be used.

The coating composition has excellent adhesion to bare or treated metals such as aluminum or steel or to metals which have been previously primed or paint with alkyd, epoxy or acylic enamels. Also, the coating composition can be a highly pigmented coating or can be used as a clear coating.

Finishes of the novel composition have particularly excellent physical properties as stated above including excellent adhesion to primed and unprimed metal substrates, toughness, hardness and crack resistance. The composition is not only useful for coating vessels as stated above, but can be used as a coating for range parts, plumbing fixtures such as sinks, and as a clear coating for hardware items, such as saws, chisels, planes, knives and the like. Also, the coating composition can be utilized as a primary finish for refrigerators, stoves, washers, dryers and the like.

The coating composition can also be used as an adhesive for metals, glass and plastics and can be used to form laminates. Also, the novel composition can be used to impregnate woven and non-woven webs of natural and synthetic fibers to form high quality compositions.

The following Examples illustrate this invention. The parts and percentages are by weight unless otherwise specified.

EXAMPLE 1

The following constituents are blended together:

|  | Parts By Weight |
|---|---|
| Titanium dioxide pigment | 75.0 |
| FEP Copolymer powder (copolymer of tetrafluoroethylene and hexafluoropropylene weight ratio 84/16) | 75.0 |
| Polysulfone solution (20% solids in cyclohexanone of a polysulfone resin of the formula $\left[-O-\bigcirc-\underset{\underset{CH_3}{|}}{\overset{\overset{CH_3}{|}}{C}}-\bigcirc-O-\bigcirc-SO_2-\bigcirc-\right]_x$ where x is from 50–80) | 373.0 |
| Xylene | 110.0 |
| Cyclohexanone | 110.0 |
| N-methyl pyrrolidone | 55.5 |
| Dimethyl diphenyl siloxane oil having a viscosity of 20,000 centistokes | 1.5 |
| Total | 800.0 |

The blend of the above ingredients is charged into a pebble mill and ground for about 91 hours to form a uniform dispersion that has a fineness of about 0.6 mils. The above composition is reduced to a spray viscosity using a conventional thinner and then sprayed onto an aluminum panel and baked for 15 minutes at 250° C. The resulting finish is about 2 mils thick and is heat resistant, has excellent adhesion to the substrate and has excellent food release properties.

EXAMPLE 2

A fluorocarbon polymer dispersion is prepared as follows:

| | Parts By Weight |
|---|---|
| Portion 1 | |
| FEP copolymer powder (copolymer of tetrafluoroethylene/hexafluoropropylene weight ratio of 89/11) | 31.60 |
| Acrylic resin solution (40% polymer solids of a methyl methacrylate/MESO* copolymer weight ratio of 68/32 in organic solvent blend of toluene/acetone/ methylethyl ketone) | 2.10 |
| Methyl isobutyl ketone | 55.80 |
| Portion 2 | |
| Methyl isobutyl ketone | 5.50 |
| Portion 3 | |
| Methyl isobutyl ketone | 5.00 |
| Total | 100.00 |

Portion 1 is premixed and charged into a pebble mill and ground 8000 cycles while cooling and composition. Portion 2 is added and ground for 5 minutes and then Portion 3 is added and ground for 5 minutes giving a uniform dispersion.

Two coating compositions are then prepared as follows:

| | Parts By Weight |
|---|---|
| Coating Composition A | |
| Polysulfone resin solution (described in Example 1) | 137.50 |
| Fluorocarbon polymer dispersion (prepared above) | 70.76 |
| Total | 208.26 |
| Coating Composition B | |
| Polysulfone resin solution (described in Example 1) | 187.50 |
| Fluorocarbon polymer dispersion (prepared above | 39.31 |
| Total | 226.81 |

For each of the above compositions A and B, the ingredients are thoroughly blended together to form a uniform dispersion.

Aluminum muffin pans and aluminum panels are grit blasted using No. 80 Alumina at 80 psi. pressure to form a roughened surface on the aluminum. Each of the above compositions A and B are reduced to a spray viscosity using a conventional thinner. Coating composition A is then sprayed onto a set of two aluminum panels and a set of two muffin pans and the coated panels and pans are baked as follows: one panel and one pan are baked at 260° C. for 15 minutes and the other panel and pan are baked at 315° C. for 15 minutes. Coating composition B similarly is applied to a set of two roughened aluminum panels and a set of two muffin pans and baked as above.

In each case, the coating has excellent adherence to the substrate and has a good appearance. Baking tests show the coatings have excellent release properties and good thermal stability.

The invention claimed is:

1. A coating composition which comprises a polymer mixture of (a) 15% to 85%, by weight of an aromatic polysulfone having repeat units

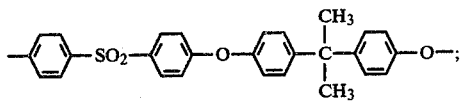

and (b) 85% to 15% by weight of at least one fluorocarbon polymer selected from polytetrafluoroethylene, copolymers of tetrafluoroethylene with about 5% to 50% by weight hexafluoropropylene and polyvinylidene fluoride, said composition being in the form of a dispersion of said fluorocarbon polymer dispersed in a solution of said thermoplastic aromatic polysulfone in a solvent therefor.

2. A composition according to claim 1 in which the concentration of thermoplastic aromatic polyfulfone is 50% to 75% by weight.

3. A composition according to claim 1 in which the fluorocarbon polymer is poly(tetrafluoroethylene).

4. A method of coating an article which comprises applying to the article a composition as claimed in claim 1, drying the coated article, and sintering the coating at temperatures of 150° to 300° C.

5. A composition according to claim 3 in which the fluorocarbon polymer is a polytetrafluoroethylene powder having diameters of about 0.01 to about 6 um.

* * * * *